United States Patent
Hirabayashi

(10) Patent No.: US 8,120,611 B2
(45) Date of Patent: Feb. 21, 2012

(54) INFORMATION PROCESSING APPARATUS AND INFORMATION PROCESSING METHOD

(75) Inventor: Yoshiyuki Hirabayashi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 918 days.

(21) Appl. No.: 11/805,646

(22) Filed: May 24, 2007

(65) Prior Publication Data

US 2008/0001954 A1    Jan. 3, 2008

(30) Foreign Application Priority Data

Jun. 29, 2006 (JP) .................................. 2006-180265

(51) Int. Cl.
G06F 15/16 (2006.01)
G06F 15/00 (2006.01)
G06F 13/00 (2006.01)

(52) U.S. Cl. .................. 345/502; 345/501; 345/536

(58) Field of Classification Search .................. 345/501, 345/502, 519, 530, 536
See application file for complete search history.

(56) References Cited

U.S. PATENT DOCUMENTS

| | | | |
|---|---|---|---|
| 3,976,826 A * | 8/1976 | Fullton, Jr. ............... | 375/240.18 |
| 6,469,743 B1 * | 10/2002 | Cheney et al. ............... | 348/553 |
| 6,734,862 B1 * | 5/2004 | Chapple et al. ............... | 345/520 |
| 6,848,058 B1 * | 1/2005 | Sinclair et al. ............... | 713/322 |
| 7,868,891 B2 * | 1/2011 | Wexler et al. ............... | 345/503 |
| 2004/0101056 A1 * | 5/2004 | Wong et al. ............... | 375/240.25 |
| 2006/0104530 A1 * | 5/2006 | Smirnov ............... | 382/245 |
| 2007/0124474 A1 * | 5/2007 | Margulis ............... | 709/226 |
| 2007/0157211 A1 * | 7/2007 | Wang et al. ............... | 719/313 |

FOREIGN PATENT DOCUMENTS

JP    2001-084363    3/2001

* cited by examiner

*Primary Examiner* — Joni Hsu

(74) *Attorney, Agent, or Firm* — Knobbe Martens Olson & Bear, LLP

(57) ABSTRACT

In an information processing apparatus (1) according to the invention, a GMCH (13) is connected to a CPU (11) through a CPU bus (12), and an ICH (15) is connected to the GMCH (13) through a dedicated bus (14). The GMCH (13) includes a graphics controller (131) which borrows a part of a memory (171) mounted to a memory card (17) in order to execute display processing. A graphics card (19) can be connected to the GMCH (13). In this case, a graphics controller (131) becomes a stop state. While the graphics card (19) is connected to the GMCH (13), the CPU (11) instructs the graphics controller (13) to execute processing other than display control processing, for example, processing such as MC and IDCT. As a result, it is possible to reduce a load applied to the CPU (11).

8 Claims, 4 Drawing Sheets

INFORMATION PROCESSING APPARATUS AND INFORMATION PROCESSING METHOD

The present application is based on Japanese patent application No. 2006-180265, the entire contents of which are incorporated herein by reference.

BACKGROUND

1. Field

One embodiment of the invention relates to an information processing apparatus having a graphics controller built in a chipset and an external graphics controller (graphics card) any one of which drives a display device.

2. Description of the Related Art

For example, of users who use personal computers, some users use applications (for, e.g., making of documents, the Internet connection, and the like) none of which apply loads to CPUs, respectively, and others use applications (such as a personal computer game and a computer graphics) which apply loads to CPUs, respectively.

For this reason, personal computer makers prepare and sell personal computers of various types including ones of a low cost type, ones of a high performance type, ones manufactured for beginners, ones manufactured for power users, and the like. In order to realize the low cost promotion, some of the personal computers which are of the low cost type or which are manufactured for beginners use a graphics memory controller hub (GMCH) having a graphics function integrated into a chipset. The GMCH borrows a part (corresponding to a storage capacity of, for example, 64 MB) of a main memory mounted to a mother board, and uses the part of the main memory thus borrowed in the form of a video memory.

Moreover, some of such personal computers can be improved in its performance without purchasing a new personal computer instead of old one by installing a high-performance graphics card which a user purchased specially or a graphics card corresponding to a use purpose of the user in an accelerated graphics port (AGP) slot or the like.

When the graphics card is added to the chipset having the graphics function integrated thereinto as described above, in order to prevent two kinds of display processing from being simultaneously executed, the graphics function of the GMCH is stopped by using a basic input output system (BIOS) of the personal computer.

A computer system including the graphics integration type chipset, for example, is disclosed in Japanese Patent Kokai No. 2001-84363. In this computer system, the graphics integration type chipset is integrated into a north-bridge. In addition, in order to improve a capability of executing display processing of the graphics integration type chipset, an external graphics processor corresponding to the graphics card is connected to the graphics integration type chipset through the AGP slot. Also, a resource is allocated to the graphics integration type chipset and the external graphics processor, and the graphics integration type chipset and the external graphics processor share the display processing for display driving, thereby making it possible to enhance the efficiency of the display processing for the graphics.

In recent years, however, the performance of the graphics card (external graphics processor) has been improved, and thus the graphics card can sufficiently execute the display processing by itself. Therefore, it cannot be said that the computer system disclosed in Japanese Patent Kokai No. 2001-84363 provides a use method which makes use of the function of the graphics integration type chipset (built-in graphics function). As a result, such a construction that the graphics integration type chipset and the graphics card share the display processing has a less necessity.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION OF PREFERRED EMBODIMENTS

Various embodiments according to the invention will be described hereinafter with reference to the accompanying drawings. In general, according to one embodiment of the invention, there is provided an information processing apparatus, including: a built-in graphics controller for performing display control for a display device; and control means for, when a graphics controller is mounted from an outside, instructing the built-in graphics controller to execute information processing other than the display control processing.

In addition, according to a further embodiment of the invention, there is provided an information processing apparatus, including: a built-in graphics controller for performing display control for a display device; and a CPU for processing information, in which when a graphics controller is mounted from an outside, the CPU instructs the built-in graphics controller to execute information processing other than the display control processing.

Also, according to a still further embodiment of the present invention, there is provided an information processing method, including the steps of: starting up a built-in graphics portion; instructing the built-in graphics portion to execute a part of information processing, and executing the other part of the information processing by a control portion; and stopping the built-in graphics portion.

According to the information processing apparatus of the invention, it is possible to lighten a burden imposed on the control means by utilizing the built-in graphics function in processing other than the display processing.

[Configuration of Information Processing Apparatus]

Figure 1:
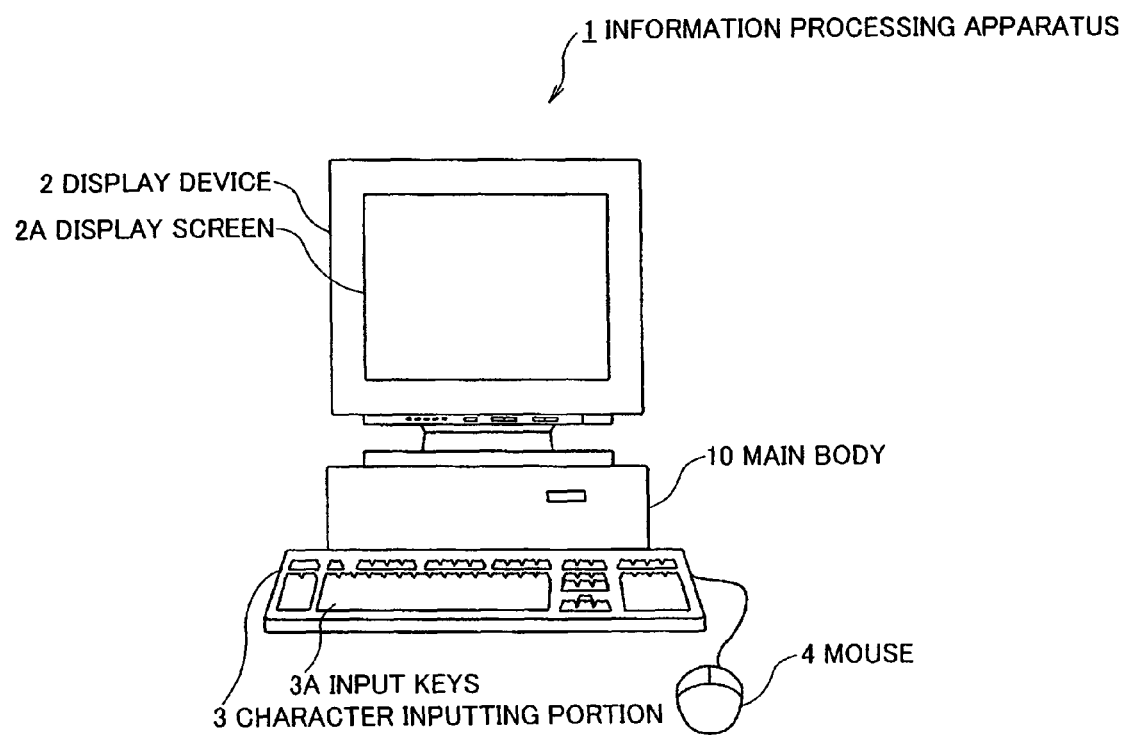
FIG. 1 is an exemplary front view showing the external appearance of an information processing apparatus according to an embodiment of the present invention.

FIG. 1 shows an outline in construction of an information processing apparatus according to an embodiment of the invention. This information processing apparatus 1 is constructed in the form of a personal computer including a main body 10 having a mother board (not shown) and the like built therein, a display device 2 mounted to an upper surface of the main body 10, and a character inputting portion 3 connected to the main body 10.

The display device 2 includes a display screen 2A on which an image corresponding to data processed in the information processing apparatus 1 or data taken in from the outside is displayed. In addition, the character inputting portion 3 includes a keyboard having input keys 3A.

Figure 2:
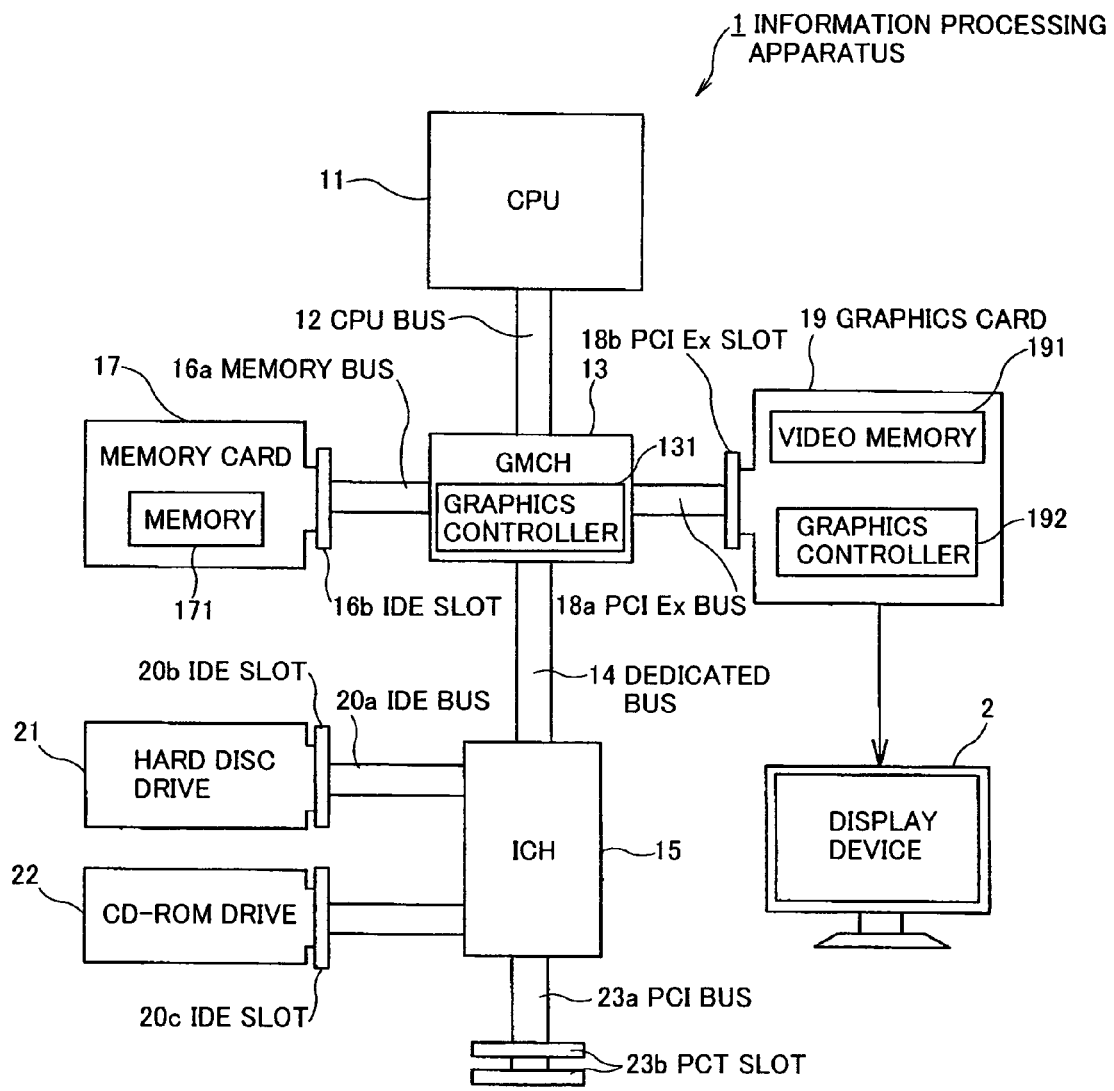
FIG. 2 is an exemplary block diagram showing a detailed configuration of the information processing apparatus according to the embodiment of the present invention.

FIG. 2 shows a detailed configuration of the information processing apparatus. The information processing apparatus 1 mainly includes a CPU 11 serving as control means, a graphics memory controller hub (GMCH) 13 connected to the CPU 11 through a CPU bus 12, and an I/O controller hub (ICH) 15 connected to the GMCH 13 through a dedicated bus 14. As described above, the GMCH 13 includes a built-in graphics function.

In the information processing apparatus 1 shown in FIG. 2, the GMCH (corresponding to a north-bridge) 13 and the ICH (corresponding to a south-bridge) 15 are constituted by dedicated LSIs each corresponding to the CPU 11, respectively. Normally, the GMCH 13 and the ICH 15 are mounted together with electronic components (ICs, diodes, capacitors, resistors, a back-up battery, sockets and the like) for a peripheral circuit to a multi-layer printed circuit board called a mother board.

The GMCH 13 includes a graphics controller 131 serving as a nucleus of a built-in graphics portion in addition to a controller (not shown) for controlling a memory 171 and the like of a memory card 17. The memory card 17 including the memory 171 having a storage capacity of, for example, 256 MB, 512 MB or the like is connected to the GMCH 13 through a memory bus 16a and a memory slot 16b. In addition, a graphics card 19 is connected to the GMCH 13 through a peripheral components interconnect bus Express (PCI Ex) bus 18a and a PCI Ex slot 18b. Here, the memory 171 may adopt a construction of being directly mounted to the mother board in addition to a construction of being mounted to the memory card 17.

The ICH 15 includes a circuit for connection of various types of drives, a circuit for sound processing, an interface circuit for a USB, a LAN, etc., and the like. A hard disc drive (HD) 21 and a CD-ROM drive 22 are connected to the ICH 15 through an IDE bus 20a and an IDE slot 20b, and an IDE slot 20c, respectively. In addition, a PCI bus 23a and a PCI slot 23b for connection of extension cards (cards for the LAN, the sound processing and the like) are connected to the ICH 15.

A display device 2 such as a CRT display device or a liquid crystal display device is connected to the graphics card 19. This display device 2 transmits a signal to the graphics card 19 in accordance with a low voltage differential signaling (LVDS) specification. As a result, the low noise promotion becomes possible.

The graphics card 19 includes a video memory 191 having a memory capacity of, for example, 64 MB, 128 MB or the like, and a graphics controller 192 for performing control for display driving of the display device 2.

[Operation of Information Processing Apparatus]

Figure 3:
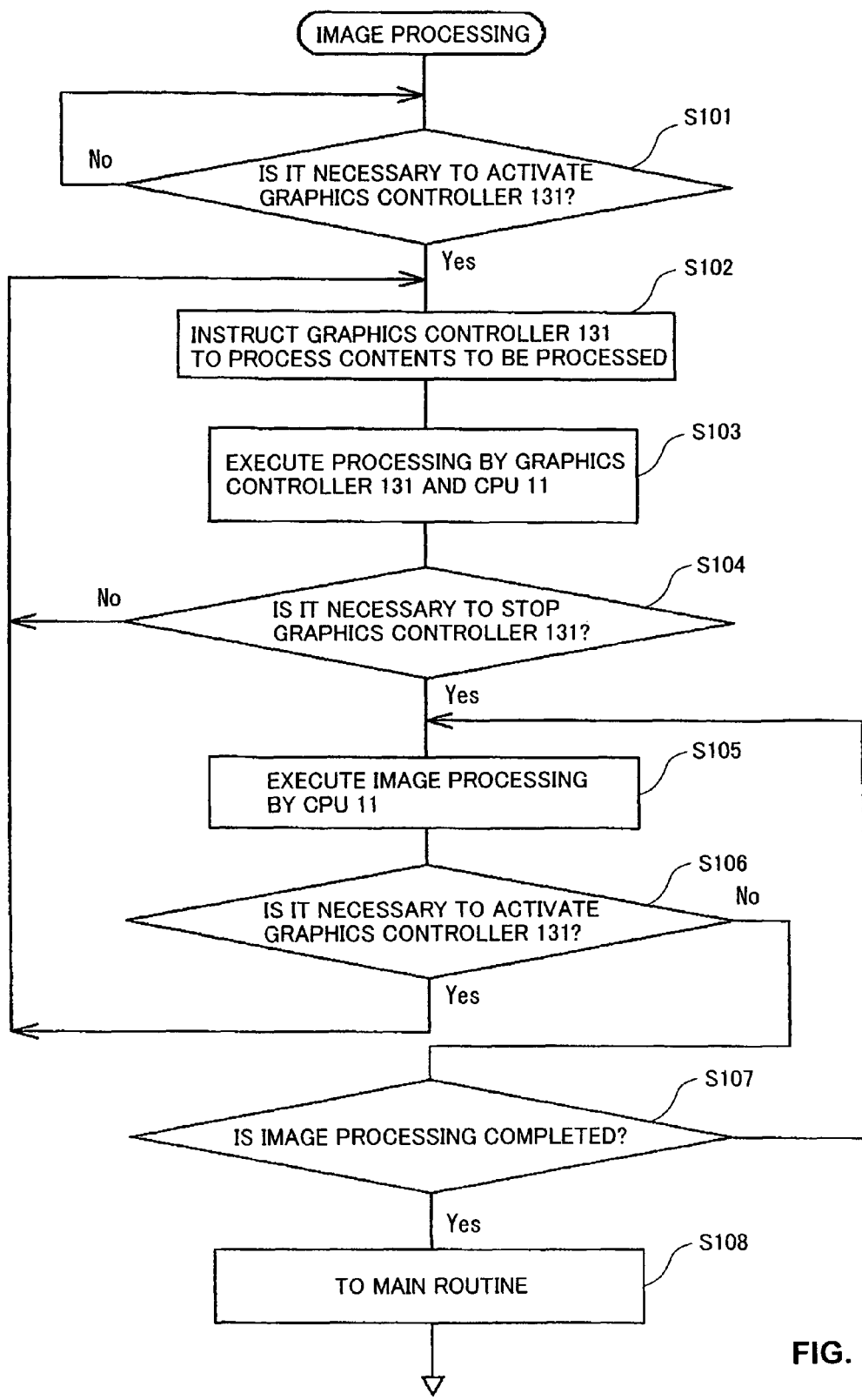
FIG. 3 is an exemplary flow chart showing an operation of the information processing apparatus according to the embodiment of the present invention.

FIG. 3 is a flow chart showing an operation of the information processing apparatus. Firstly, the CPU 11 judges whether or not it is necessary to start up the built-in graphics portion (the graphics controller 131) of the GMCH 13 (Step S101) The judgment relating to whether or not it is necessary to start up the graphics controller 131 is made in accordance with an application intended to be operated, an availability ratio of the CPU 11, a preset starting up condition and the like.

When judging that it is necessary to start up the graphics controller 131 (Step S101: Yes), the CPU 11 instructs the graphics controller 131 to process contents desired to be processed (Step S102).

In this embodiment, the graphics card 19 performs the display control (display processing) for the display device 2. Also, the graphics controller 131 of the GMCH 13 does not participate in the display control for the display device 2, but executes the processing, other than the display control processing, for example, transcode processing, a numeric value arithmetic operation, a CAD, and the like (Step S103).

For example, the transcode processing is used to transform high-speed data into low-speed data or used to re-transform a format of data concerned into another format of the data concerned. Giving an example now, the transcode processing is used to transform an MPEG-2 into an MPEG-4, or used to transform a 15 Mbps MPEG-2 into a 8 Mbps MPEG-2 having a DVD video format. This embodiment is suitable for the case where the graphics controller 131 of the GMCH 13 is instructed to execute such transcode processing.

Figure 4:
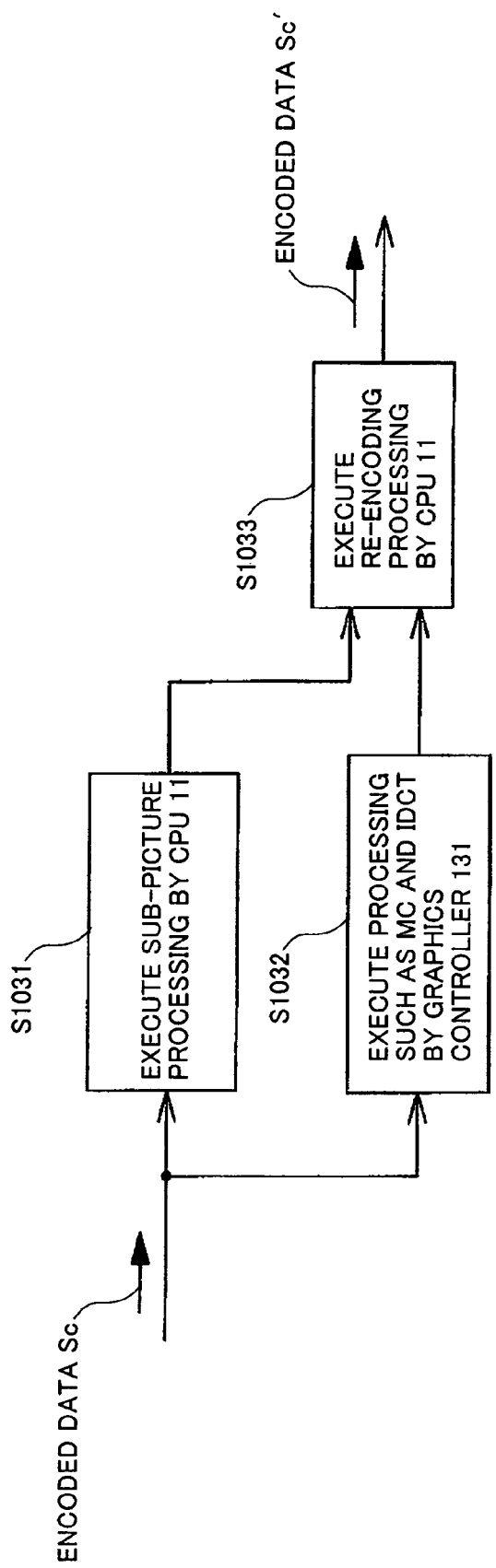
FIG. 4 is an exemplary flow chart showing transcode processing executed by a graphics controller of a graphics memory controller (GMCH) of the information processing apparatus according to the embodiment of the present invention.

FIG. 4 is a flow chart showing transcoding processing executed by the graphics controller 131 of the GMCH 13. Note that, the processing shown in FIG. 4 is merely an example.

The CPU 11 executes processing such as sub-picture processing for encoded data Sc (Step S1031), and stores the resulting data in the video memory 191 of the graphics card 19. In addition, the graphics controller 131 of the GMCH 13 subjects the encoded data Sc to processing such as motion compensation (MC) and inverse discrete cosine transform (IDCT), and develops the resulting image data on a predetermined area (an area, having a storage capacity of, for example, 64 MB, which is previously ensured for the graphics) of the memory 171 of the memory card 17 (Step S1032). The CPU 11 reads out the image data developed on the predetermined area of the memory 171 of the memory card 17, and the data on the video memory 191 of the graphics card 19, and encodes (re-encodes) the read-out data conforming to one system into necessary data conforming to another system. Thus, the resulting data is outputted as encoded data Sc' (Step S1033).

After completion of the transcode processing shown in FIG. 4 (or whenever a predetermined time elapses), the CPU 11 judges whether or not it is necessary to stop the graphics controller 131 (Step S104). When judging in Step S104 that it is necessary to stop the graphics controller 131, the CPU 11 stops the graphics function of the graphics controller 131. Then, the image processing is executed by only the CPU 11 (Step S105). After, the CPU 11 judges whether or not it is necessary to start up the graphics controller 131 (Step S106), and the operation returns back to the processing in Step S102. Then, the series of processing described above is repeatedly executed.

When judging in Step S106 that it is unnecessary to start up the graphics controller 131 (Step S106: No), the CPU 11 judges whether or not the processing of the application being executed is completed (Step S107). When the CPU 11 judges that the processing of the application being executed is not yet completed (Step S107: No), the operation returns back to the processing in Step S105. On the other hand, when the CPU 11 judges that the processing of the application being executed is completed (Step S107: Yes), the operation returns back to a main routine (Step S108).

According to this embodiment of the present invention, the built-in graphics portion (the graphics controller 131), of the GMCH 13, which essentially performs the control for the graphics display is instructed to execute the processing such as the transcode processing, which results in that the load applied to the CPU 11 can be reduced as compared with the case where the transcode processing is executed by only the CPU 11.

Note that, although the built-in graphics portion (the graphics controller 131) of the GMCH 13 is started up only when being necessary, it may be normally started up.

In addition, although it is assumed that the graphics card 19 conforms to the standard of PCI Ex, a graphics card may also be used which is connected to the GMCH 13 in accordance with AGP connection, PCI connection or the like. Note that, although a construction is adopted in which the standard of x16 is used in PCI Ex, there are the standards of x1, x2, x4 and x8 in addition to the standard of x16. Each of the standards of x1, x2, x4 and x8 is different in slot from the standard of x16, and is also different from the standard of x16 in that the destination of connection is the south-bridge.

It should be noted that the invention is not intended to be limited to the above-mentioned embodiment, and the various changes thereof can be made by those skilled in the art without departing from or changing the technical idea of the invention.

For example, in the above-mentioned embodiment, when a plurality of display streams are reproduced, image data which is decoded by using the graphics controller 131 can also be transferred to the graphics card 19.

What is claimed is:

1. An information processing apparatus, comprising:
   a built-in graphics controller configured to perform display control for a display device; and
   a central processing unit (CPU) configured to process information,
   wherein, when a graphics card is installed, the CPU instructs the built-in graphics controller to execute information processing for other than the display control processing in accordance with an information processing situation of the CPU, the information processing situation based on an application intended to be operated, an availability ratio of the CPU, and a preset starting up condition,
   the graphics card includes an external graphics controller which uses a dedicated memory built in the external graphics controller when processing information,
   the CPU instructs the built-in graphics controller to perform transcode processing, and the external graphics controller performs display processing in parallel with the transcode processing,
   the built-in graphics controller is configured to transfer decoded image data to the external graphics controller,
   the built-in graphics controller is further configured to execute transcode processing,
   the built-in graphics controller is further configured to execute at least one of motion compensation processing or inverse discrete cosine transform on encoded data and store the processed data in a main memory,
   the CPU is configured to execute subpicture processing on the encoded data and to store the processed subpicture data in a memory of the external graphics card, and
   the CPU is further configured to retrieve the data from each of the main memory and the external graphics card memory, and re-encode the retrieved data into a different format.

2. An information processing apparatus according to claim 1, wherein the built-in graphic controller, when executing the information processing, uses a main memory which the CPU uses.

3. An information processing apparatus according to claim 1, wherein the built-in graphics controller is included in a graphics memory controller hub (GMCH).

4. An information processing apparatus according to claim 1, wherein the graphics card conforms to a standard of an accelerated graphics port (AGP) or a PCI Express.

5. The information processing apparatus of claim 1, wherein the CPU is configured to control starting up and stopping of the built-in graphics controller in accordance with a processing situation of encoded data.

6. An information processing apparatus according to claim 1, wherein the external graphics controller is mounted from an outside, the CPU instructs the external graphics controller to perform information processing of the display control processing, and instructs the built-in graphics controller to execute information processing other than the display control processing.

7. An information processing method, comprising:
   starting up a built-in graphics portion;
   instructing the built-in graphics portion to execute a part of information processing, and executing the other part of the information processing by a central processing unit (CPU); and
   stopping the built-in graphics portion,
   wherein in the starting up step, the CPU analyzes a situation that includes an application intended to be operated, an availability ratio of the CPU, and a preset starting up condition, and when judging that a load applied to the information processing is large, the CPU starts up the built-in graphics portion, or when judging that a load applied to the information processing is small, the CPU stops the built-in graphics portion,
   the built-in graphics portion is instructed to execute transcode processing as a part of the information processing,
   the transcode processing is performed on encoded data, and the transcode processing comprises:
      executing subpicture processing on the encoded data by the CPU,
      storing the subpicture processed data in a memory of an external graphics card,
      executing, by the built-in graphics portion, at least one of motion compensation processing or inverse discrete cosine transform on the encoded data and storing the processed data in a main memory,
      retrieving, by the CPU, the data from each of the main memory and the external graphics card memory, and
   re-encoding the retrieved data into a different format.

8. An information processing method according to claim 7, wherein, the CPU determines a part of the information processing, and instructs the built-in graphics portion to execute the part of the information processing thus determined.

\* \* \* \* \*